United States Patent
Jung et al.

(10) Patent No.: US 11,673,534 B2
(45) Date of Patent: Jun. 13, 2023

(54) COVER CIRCULATION TYPE SENSOR PROTECTION UNIT AND AUTONOMOUS VEHICLE HAVING THE SAME

(71) Applicants: HYUNDAI MOTOR COMPANY, Seoul (KR); Kia Motors Corporation, Seoul (KR)

(72) Inventors: Hwi-Sung Jung, Hwaseong-si (KR); Jeong-Ho Lee, Suwon-si (KR); Jae-Wung Seo, Goyang-si (KR); Byung-Kyu Yoon, Uiwang-si (KR); Sang-Hyeok Seo, Seoul (KR); Seon-Min Kim, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 812 days.

(21) Appl. No.: 16/568,766

(22) Filed: Sep. 12, 2019

(65) Prior Publication Data
US 2020/0108802 A1    Apr. 9, 2020

(30) Foreign Application Priority Data
Oct. 8, 2018    (KR) .................. 10-2018-0119714

(51) Int. Cl.
*B60S 1/56* (2006.01)
*G02B 27/00* (2006.01)
(Continued)

(52) U.S. Cl.
CPC .............. *B60S 1/56* (2013.01); *B60S 1/0405* (2013.01); *F16K 31/44* (2013.01);
(Continued)

(58) Field of Classification Search
CPC .... B60S 1/56; B60S 1/60; B60S 1/566; B60S 11/00; G01S 7/027; G01S 7/4043;
(Continued)

(56) References Cited

U.S. PATENT DOCUMENTS 3,659,307 A  *  5/1972  Vitou ...................... B60S 1/603
                                                     15/250.1
7,633,548 B2 * 12/2009  Misawa ............... H04N 5/2252
                                                      396/326
(Continued)

FOREIGN PATENT DOCUMENTS

JP         2013133059 A      7/2013
KR     10-2004-0082162 B1    9/2004
KR         100527743 B1     11/2005

*Primary Examiner* — Craig M Schneider
*Assistant Examiner* — Christopher D Ballman
(74) *Attorney, Agent, or Firm* — Lempia Summerfield Katz LLC (57) ABSTRACT

A sensor protection apparatus includes a first sensor cover movable between a sensor covering position and a first cover waiting position; a second sensor cover movable between the sensor covering position and a second cover waiting position, wherein each of the first and second sensor covers is located at the sensor covering position for protecting the surface of the sensor from being contaminated by foreign matter; and an actuator configured to move the first and second sensor covers such that the first sensor cover and the second sensor cover are alternately located at the sensor covering positions thereof.

16 Claims, 7 Drawing Sheets

(51) Int. Cl.
*F16K 31/44* (2006.01)
*B60S 1/04* (2006.01)
*G08G 1/04* (2006.01)
*G01S 7/02* (2006.01)
*G01S 13/931* (2020.01)
*G01S 7/481* (2006.01)
*G01S 7/40* (2006.01)
*B60S 1/60* (2006.01)
*B60S 11/00* (2006.01)
*G01S 7/497* (2006.01)
*G01S 17/931* (2020.01)

(52) U.S. Cl.
CPC ........... G02B 27/0006 (2013.01); *B60S 1/566* (2013.01); *B60S 1/60* (2013.01); *B60S 11/00* (2013.01); *G01S 7/027* (2021.05); *G01S 7/4043* (2021.05); *G01S 7/4813* (2013.01); *G01S 13/931* (2013.01); *G01S 17/931* (2020.01); *G01S 2007/4977* (2013.01); *G01S 2013/9323* (2020.01); *G01S 2013/93271* (2020.01); *G08G 1/04* (2013.01)

(58) Field of Classification Search
CPC ................. G01S 7/4813; G01S 17/931; G01S 2007/4977; G01S 2013/9323; G01S 2013/93271; G01S 13/931

See application file for complete search history.

(56) References Cited

U.S. PATENT DOCUMENTS

| | | | | |
|---|---|---|---|---|
| 7,965,336 | B2* | 6/2011 | Bingle | G03B 17/02 |
| | | | | 348/149 |
| 8,387,632 | B2* | 3/2013 | Saito | H04N 5/2251 |
| | | | | 15/103 |
| 9,380,190 | B2* | 6/2016 | Pawlowski | H04N 5/2171 |
| 9,602,703 | B1* | 3/2017 | Raphael | G02B 27/0006 |
| 9,645,392 | B2* | 5/2017 | Yoshimura | B60R 11/04 |
| 9,880,382 | B1* | 1/2018 | Tippy | G03B 11/04 |
| 10,589,726 | B1* | 3/2020 | Ingram | B60S 1/28 |
| 10,682,987 | B2* | 6/2020 | Trebouet | B60S 1/46 |
| 2002/0139394 | A1* | 10/2002 | Bronson | G02B 27/0006 |
| | | | | 134/6 |
| 2012/0000024 | A1* | 1/2012 | Layton | G03B 17/56 |
| | | | | 15/97.1 |
| 2015/0246660 | A1* | 9/2015 | Seedall | G02B 27/0006 |
| | | | | 359/507 |
| 2017/0036647 | A1* | 2/2017 | Zhao | B05B 1/04 |
| 2017/0313288 | A1* | 11/2017 | Tippy | B60R 1/0602 |
| 2018/0265048 | A1* | 9/2018 | Schmidt | B08B 5/02 |
| 2019/0351464 | A1* | 11/2019 | Kim | B08B 5/02 |

* cited by examiner

ENLARGED VIEW OF PART A

FIG. 3

ENLARGED VIEW OF PART B

COVER CIRCULATION TYPE SENSOR PROTECTION UNIT AND AUTONOMOUS VEHICLE HAVING THE SAME

CROSS-REFERENCE TO RELATED APPLICATION

This application claims priority to Korean Patent Application No. 10-2018-0119714, filed on Oct. 8, 2018, the disclosure of which is incorporated herein by reference in its entirety.

BACKGROUND OF THE DISCLOSURE

Field of the Disclosure

The present disclosure relates to a sensor protection apparatus and an autonomous vehicle equipped with the apparatus.

Description of the Related Art

Autonomous vehicles which have been developed quickly in recent years utilize sensors along with a global positioning system (GPS) to recognize front and rear and left and right directions and objects around the vehicles.

For example, such sensors are classified into a radio wave detection and ranging (radar) and a light detection and ranging (lidar) with respect to whether to be exposed for operation. The radar is a non-exposure type sensor, which accurately measures relative distance to an object and relative speed of the object with respect to an observation point by transmitting and receiving electromagnetic wave and provides them to the vehicle. On the other hand, the lidar is an exposure type sensor, which finds position of the subject vehicle and calculates direction of travel, distance between the subject vehicle and a front vehicle and the like in cooperation with the GPS by calculating signals reflected after light is transmitted to an object and recognizing shape of the object locating within a certain range as a three-dimensional (3D) shape.

SUMMARY OF THE DISCLOSURE

An aspect of the present disclosure is to provide a cover circulation type sensor protection unit by which performance of a sensor for ensuring safety of autonomous driving under environmental conditions of snowfall or rainfall is maintained by keeping permeability of a cover always optimal by means of a cover circulation structure in which a contaminated cover is replaced with a clean cover and particularly both restriction to material of the cover and restriction to temperature of heating wires are eliminated by virtue of not using any heating wire in removing foreign matter to ensure permeability of the cover, and to provide an autonomous vehicle having the cover circulation type sensor protection unit.

Other aspects and advantages of the present disclosure can be understood by the following description and become apparent with reference to the embodiments of the present disclosure. Also, it is obvious to those skilled in the art to which the present disclosure pertains that the aspects and advantages of the present disclosure can be realized by the means as claimed and combinations thereof.

In accordance with one aspect of the present disclosure, a sensor protection unit comprises a sensor shutter for exchanging position of foreign matter on a front part of a sensor such that performance of the sensor is not deteriorated due to the foreign matter.

In an embodiment, the exchange of the position is made by means of a circulation structure.

In an embodiment, the sensor shutter comprises a sensor cover for exchanging the position of the foreign matter on the front part of the sensor and an actuator for generating power to exchange position of the sensor cover.

In an embodiment, the sensor cover is coupled to the actuator via a rotary shaft and the exchange of the position is made by means of rotation of the rotary shaft by the power of the actuator. The sensor cover is divided into a first cover and a second cover wherein only any one of the first and second covers is positioned on the front part of the sensor. The first cover enters under the sensor by the exchange of the position while the second cover enters above the sensor by the exchange of the position.

In an embodiment, each of the first and second covers is provided with cover legs having a distance spaced apart from the sensor wherein the cover legs are coupled to the rotary shaft.

In an embodiment, the sensor shutter further comprises wipers coupled to a sensor housing in a manner of being positioned above and below the sensor respectively to remove the foreign matter while exchanging the position of the foreign matter and the sensor housing having an open space formed therein, to which the wipers are coupled.

In an embodiment, a drainage culvert forming a space for collecting the foreign matter is provided at a coupled portion between the wipers and the sensor housing. The drainage culvert is arranged in the inner space of the sensor housing. The drainage culvert is formed in a curved shape structure having a vertex at the central portion.

In accordance with another aspect of the present disclosure, an autonomous vehicle comprises: a sensor protection unit including a sensor cover configured to rotate by an actuator such that a front part contaminated by foreign matter is exchanged with a clean front part and wipers coupled to a sensor housing having an open space in which a sensor is located to remove the foreign matter adhered to the sensor cover; a radiator grille having the sensor protection unit; and a radar exposed to the outside from the radiator grill, of which deterioration of performance due to the foreign matter is prevented by means of the exchange of the position of the sensor cover.

In an embodiment, the radiator grille is provided with a sensor hole for exposing the radar associated with the sensor protection unit to the outside.

In an embodiment, the sensor protection unit comprises a controller for implementing the exchange of the position of the sensor cover by controlling the actuator wherein the controller includes a data map in which a table about sensitivity of the sensor and temperature of the ambient air is constructed and outputs control signal to the actuator.

In an embodiment, the controller is associated with an operation button wherein the operation button is divided into a manual button and an automatic button which send signal to the controller.

The autonomous vehicle according to the present disclosure adopts the cover circulation type sensor protection unit so that the following actions and effects are realized.

First, as any heating wire is not used for ensuring permeability of a sensor cover, it is possible to develop a sensor protection unit that can be applied to a radar and the like without considering restriction to material of a cover and restriction to temperature of heating wires. Second, it is possible to prevent deterioration of performance of a sensor cover due to operation of heating wires and contamination of the sensor cover, thereby ensuring performance of the radar. Third, even if heavy snow falls or freezing occurs after parking, it is possible to ensure autonomous driving performance and protect a radar sensor by replacing a sensor cover with a clean sensor cover. Fourth, it is possible to maintain performance of the radar by means of a circulation type cover and thus configure the radar into a complete unexposed type radar, thereby protecting a sensor from various hazardous environments. Fifth, it is possible to minimize or prevent interruption of autonomous driving of an autonomous vehicle due to contaminants, thereby enabling stable autonomous driving.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The above and other aspects, features and other advantages of the present disclosure will be more clearly understood from the following detailed description taken in conjunction with the accompanying drawings, in which.

DESCRIPTION OF EMBODIMENTS

Hereinafter, embodiments of the present disclosure will be described in detail with reference to the accompanying drawings. However, these embodiments are merely illustrative but not restrictive to the present disclosure because various different embodiments of the present disclosure can be implemented by a person skilled in the art.

In one implementation of an autonomous vehicle, a radar is provided with a radar permeable cover to which heating wires are applied so that it is shielded from external contaminant sources and protected from heavy snowfall and freezing in the winter, which cause incapability of use of the radar.

Therefore, the radar is protected from contamination by the contaminant sources and breakdown whereby stable autonomous driving of the autonomous vehicle can be realized.

Autonomous vehicles may further have an improved protection structure to provide strengthened performance in radar for ensuring safety of autonomous driving without being obstructed even in bad weather conditions such as snowfall, rainfall and freezing.

In developing sensor covers, strengthening performance of protecting a radar may involve consideration on restrictions to the cover material, for example, restriction to material of a permeable cover for a radar, to which heating wires are applied, and the restriction to temperature of heating wires that can avoid freezing without giving an adverse effect to the performance of the radar cover for the radar because a general material of heating wires for defrosting is of a resistance body and adversely affects permeability performance of high-frequency radar wave.

Further, strengthening protection performance of a lidar includes application of clean technology capable of preventing and removing contamination due to external exposure.

Figure 1:
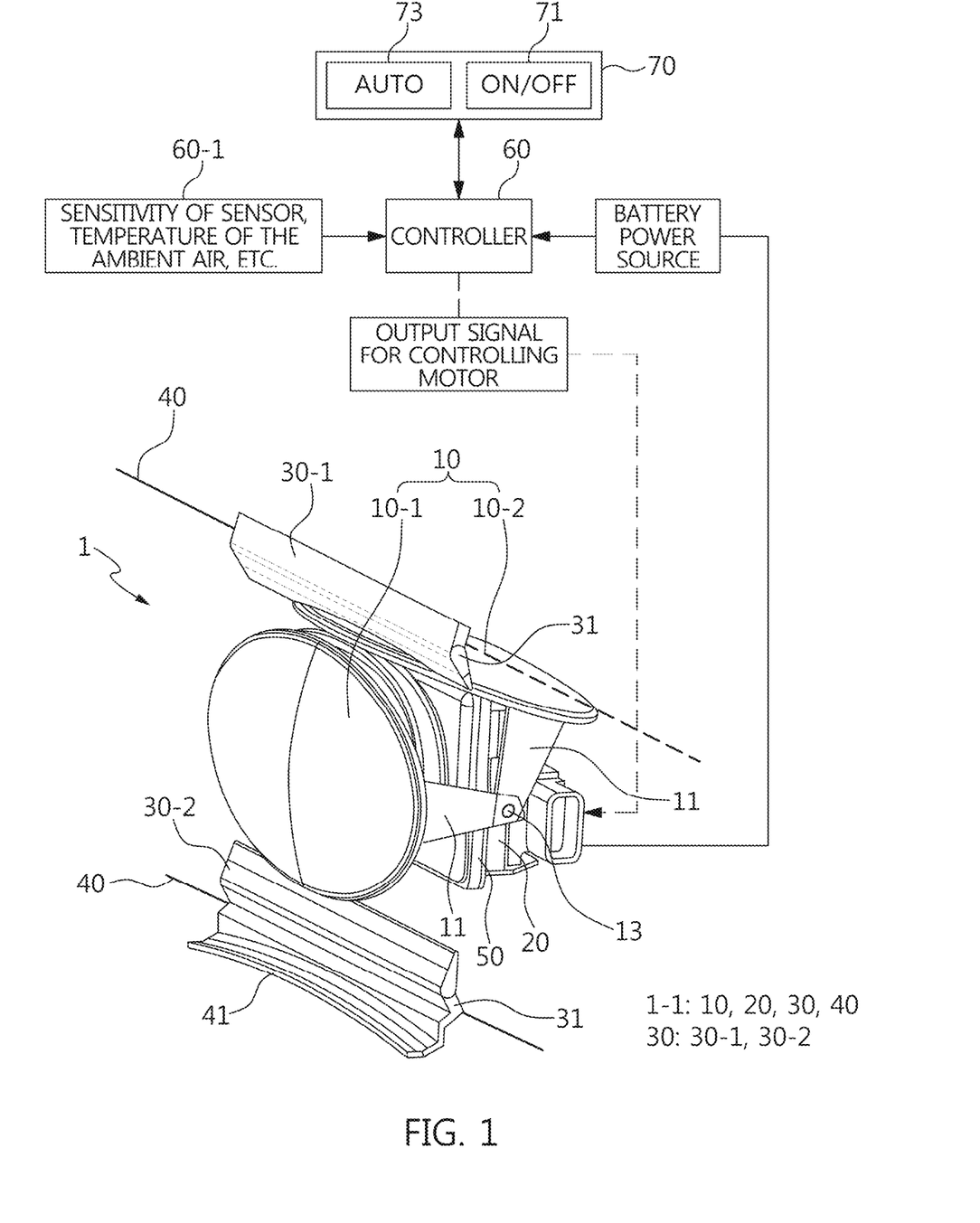
FIG. 1 is a block diagram of a cover circulation type sensor protection unit according to an embodiment of the present disclosure.

Referring to FIG. 1, a sensor protection unit 1 comprises a sensor shutter 1-1, a sensor 50, a controller 60 and an operation button circuit 70. Particularly, the sensor shutter 1-1 has a cover circulation structure in which a cover contaminated by foreign matter is replaced with another cover that is clean. Therefore, the sensor protection unit 1 may be specified as a cover circulation type sensor protection unit.

Specifically, the sensor shutter 1-1 comprises a sensor cover 10, an actuator 20, a wiper 30 and a sensor housing 40.

For example, the sensor cover 10 comprises a first cover 10-1 and a second cover 10-2 which are integrated with each other via a rotary shaft 13. The first cover 10-1 is made of a radio wave permeable material. This is dimensioned to cover the size of the sensor 50 and has a structure in which cover legs 11 protrude from both sides. The second cover 10-2 is made of a radio wave permeable material. This is dimensioned to cover the size of the sensor 50 and has a structure in which cover legs 11 protrude from both sides.

In one implementation, the width between the cover legs 11 of the first cover 10-1 is narrower than the width between the cover legs 11 of the second cover 10-2 so that the first cover 10-1 and the second cover 10-2 are assembled in a superposed state. Further, the cover legs 11 protrude from each of the first and second covers 10-1 and 10-2 by a length having a distance spaced from the sensor 50.

Further, each of the cover legs 11 has a trapezoidal shape and holes are drilled at both free end portions of the cover legs to allow a rotary shaft 13 to fit therein. Therefore, the rotary shaft 13 is fit into the holes of the cover legs 11 and penetrates through a housing of the actuator 20, thereby integrating the first cover 10-1 and the second cover 10-2. Therefore, when the first cover 10-1 covers the front surface of the sensor 50 with being spaced apart from the sensor, the second cover 10-2 enters above or below the sensor 50 and is located in the sensor housing 40.

For example, the actuator 20 is powered under the control of the controller 60 and the rotary shaft 13 thereof is rotated forward or backward by rotation of a shaft of a motor or movement of a rod of a solenoid valve.

For example, the wipers 30 are coupled to the sensor housing 40 to be arranged above and below the sensor 50 wherein each of the wipers comprises a frame constituting a coupling portion to the sensor housing 40 and a blade of a rubber material provided at the frame to remove foreign matter adhered to the surface of the sensor 50. In particular, the wipers 30 are divided into an upper wiper 30-1 arranged above the sensor 50, using the sensor housing 40, and a lower wiper 30-2 arranged below the sensor 50, using the sensor housing 40.

For example, the sensor housing 40 forms an open space configured to expose the front surface of the sensor 50 to the outside wherein a drainage culvert 41 is formed above and below the open space respectively. Particularly, the drainage culvert 41 is formed in a curved shape structure having a vertex point at the central portion such that foreign matter is pushed rightward and leftward by action of gravity and is easily discharged to the outside.

Specifically, the sensor 50 may be a radar which is an electromagnetic wave transmission/reception sensor or a lidar which is a light irradiation sensor.

Specifically, the controller 60 may generate control signal to the motor or the solenoid valve of the actuator 20. Particularly, the controller 60 controls the rotation direction of the actuator 20 to a forward or reverse rotation, or the moving direction of the actuator to a forward or backward movement.

Further, the controller 60 is provided with a data map or data map module 60-1 wherein the data map 60-1 detects and identifies sensitivity of the sensor 50 for performance of the sensor and temperature of the ambient air around the sensor 50 as input information and constructs this input information in a table. In one embodiment, the input information is detected by typical sensors installed in the vehicle.

Specifically, the operation button circuit 70 includes a manual button 71 and an automatic button 73. The manual button 71 is of a push button type in which pressing by a driver is set as turning on (ON) and depressing is set as turning off (OFF) and transmits an ON/OFF signal as an operation signal of the controller 60 wherein the controller 60 outputs a signal for controlling the actuator at ON. The automatic button 73 causes the controller 60 to automatically output signal for controlling the actuator in association with the data map 60-1.

Figure 2:
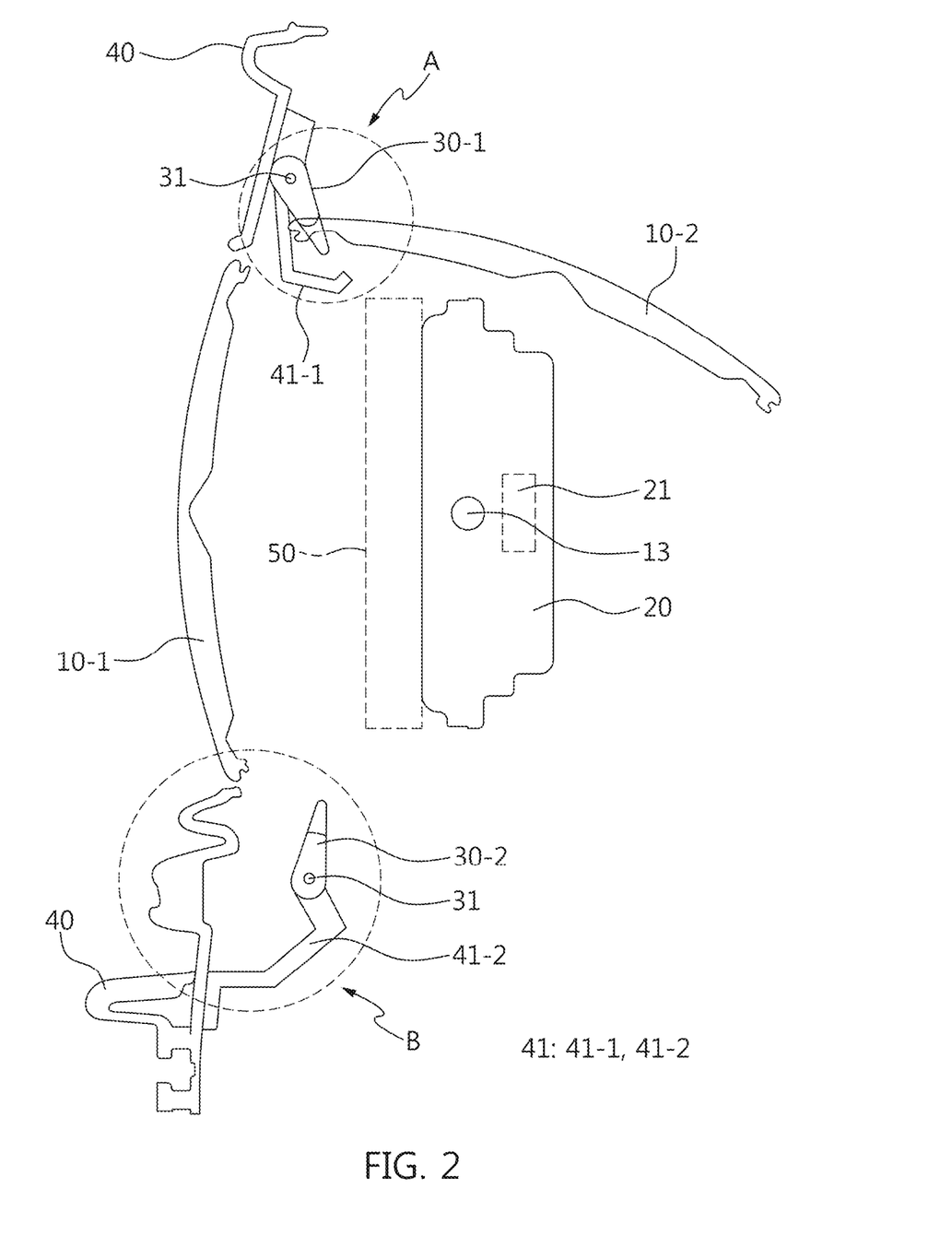
FIG. 2 is a section view of a cover circulation type sensor protection unit according to an embodiment of the present disclosure.

FIG. 2 shows a section view of the sensor protection unit 1 in which the sensor cover 10, the actuator 20, the wipers 30, the sensor housing 40 and the sensor 50 are assembled.

Specifically, the sensor cover 10 is configured such that when the rotary shaft 13 is rotated by the power of the actuator 20 in a state where the first and second covers 10-1 and 10-2 are fixed, the first cover 10-1 (or the second cover 10-2) covering the front surface of the sensor 50 is moved upward or downward of the sensor 50 whereby the second cover 10-2 (or the first cover 10-1) comes out to the front surface of the sensor 50.

In one embodiment, the rotation of the rotary shaft 13 makes it possible for the first cover 10-1 or the second cover 10-2 to be turned upward or downward to a position out of the sensor 50, thereby enabling movement of changing the position of the sensor for covering the front surface of the sensor 50. To this end, the rotary shaft 13 is associated with a rotation conversion member 21 of the actuator 20.

Specifically, the actuator 20 is provided with the rotation conversion member 21 arranged in the inner space in which an output part of the actuator is located wherein the rotation conversion member 21 is composed of a rotary gear member (for example, a worm and worm wheel) for converting rotation of the motor to rotation of the rotary shaft 13 or a linear gear member (for example, a rack and pinion) for converting movement of the solenoid valve to rotation of the rotary shaft 13.

Therefore, the worm wheel or the rack is arranged at the output part of the actuator 20 while the worm or the pinion is arranged at the rotary shaft 13. In one embodiment, since the rotary gear member or the linear gear member is a typical rotation conversion means.

Specifically, the wipers 30 are configured such that the upper wiper 30-1 and the lower wiper 30-2 are fixedly coupled to the sensor housing 40 via fixing pins 31 respectively.

Therefore, it is possible to maintain a fixed position of the upper wiper 30-1 such that the upper wiper does not remove foreign matter until a blade and a surface of the sensor cover are in contact with each other by movement of the first cover 10-1 (or the second cover 10-2). Further, it is possible to maintain a fixed position of the lower wiper 30-2 such that the lower wiper does not remove foreign matter until a blade and the surface of the sensor cover are in contact with each other by movement of the second cover 10-2 (or the first cover 10-1).

Specifically, the drainage culvert 41 is formed in the sensor housing 40 and includes an upper drainage culvert 41-1 formed below the upper wiper 30-1 and a lower drainage culvert 41-2 formed below the lower wiper 30-2. In one implementation, each of the upper and lower drainage culverts 41-1 and 41-2 may be integrally formed with the sensor housing 40 but may be coupled to the sensor housing 40 by welding or bolting after manufacturing them as separate components.

Particularly, each of the upper and lower drainage culverts 41-1 and 41-2 is formed in a curved shape structure having a vertex at the central portion so that the foreign matter K fallen from the sensor cover is pushed rightward and leftward by action of gravity and thus easily discharged to the outside. Further, the upper drainage culvert 41-1 is provided with an open space allowing the second cover 10-2 to pass by it and the lower drainage culvert 41-2 is provided with an open space allowing the first cover 10-1 to pass by it.

Figure 3:
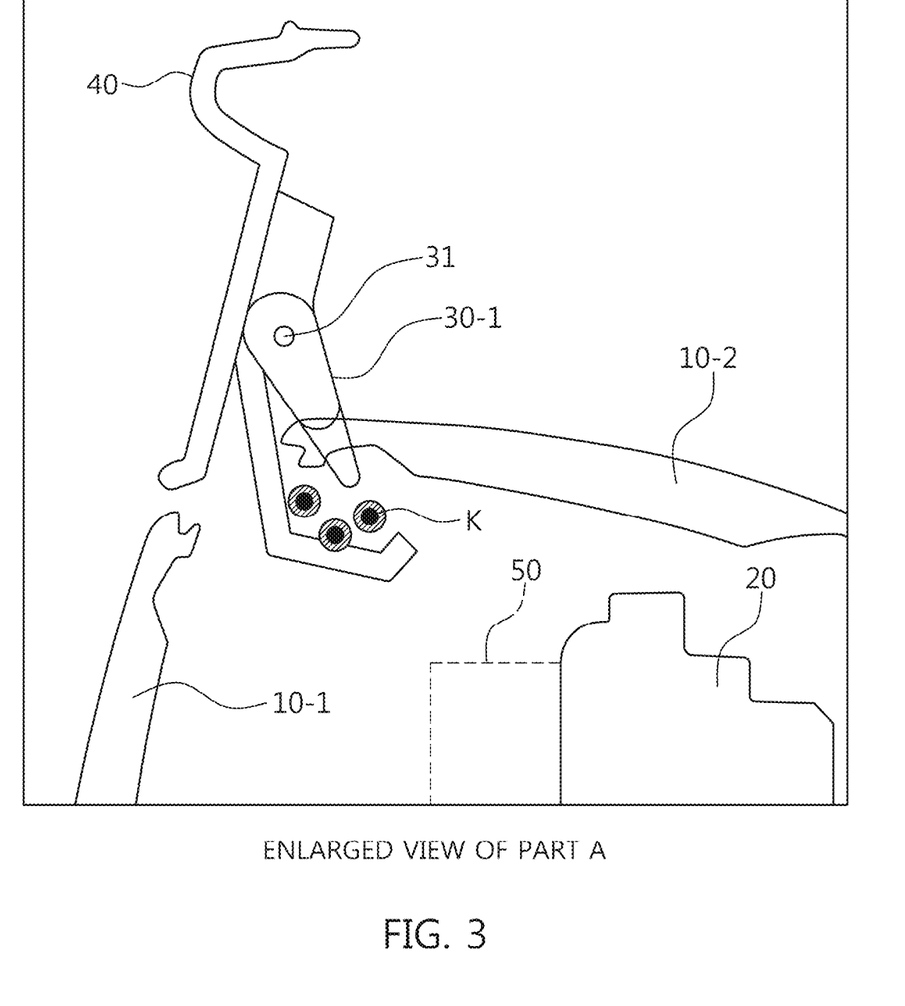
FIG. 3 is an enlarged component view of a part A in FIG. 2 according to an embodiment of the present disclosure.
Figure 4:
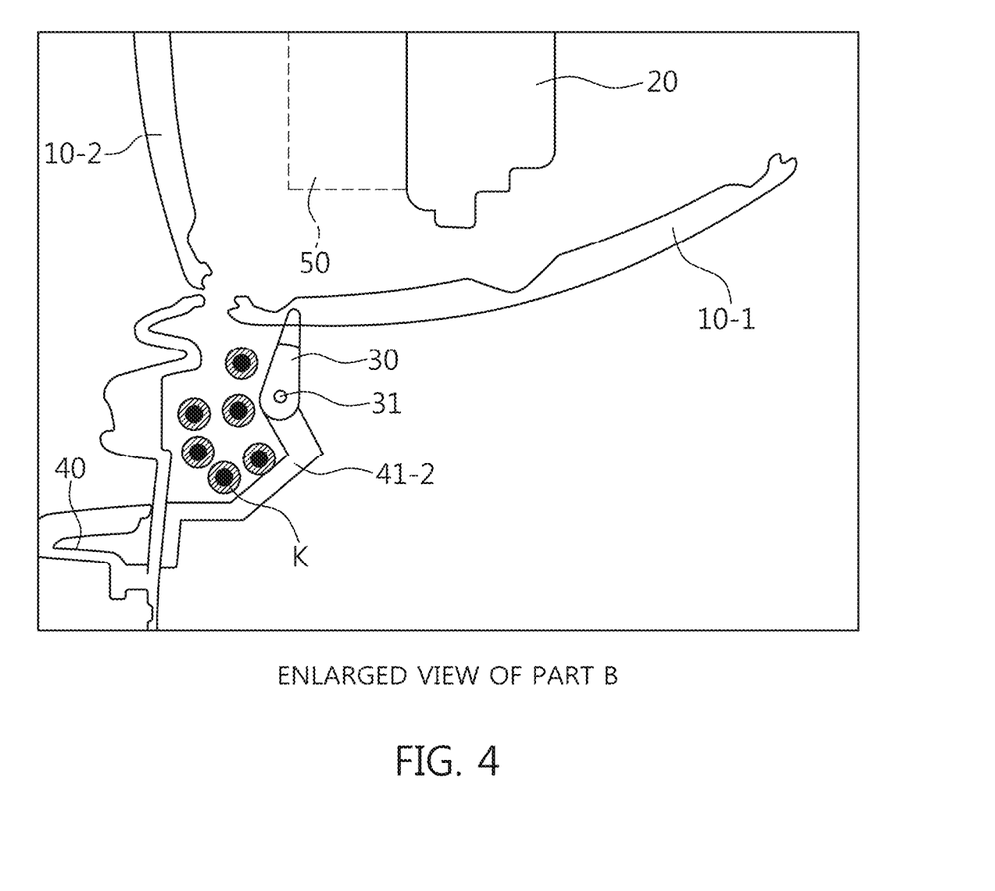
FIG. 4 is an enlarged component view of a part B in FIG. 2 according to an embodiment of the present disclosure.

FIGS. 3 and 4 show a state in which the foreign matter K on the first and second covers 10-1 and 10-2 is removed by the wipers 30 and collected in the drainage culverts 41.

Referring to FIG. 3, the upper wiper 30-1 removes the foreign matter K adhered to the second cover 10-2 in the movement path of the second cover 10-2 and then the removed foreign matter is collected in the upper drainage culvert 41-1. Referring to FIG. 4, the lower wiper 30-2 removes the foreign matter K adhered to the first cover 10-1 in the movement path of the first cover 10-1 and then the removed foreign matter is collected in the lower drainage culvert 41-2.

Figure 5:
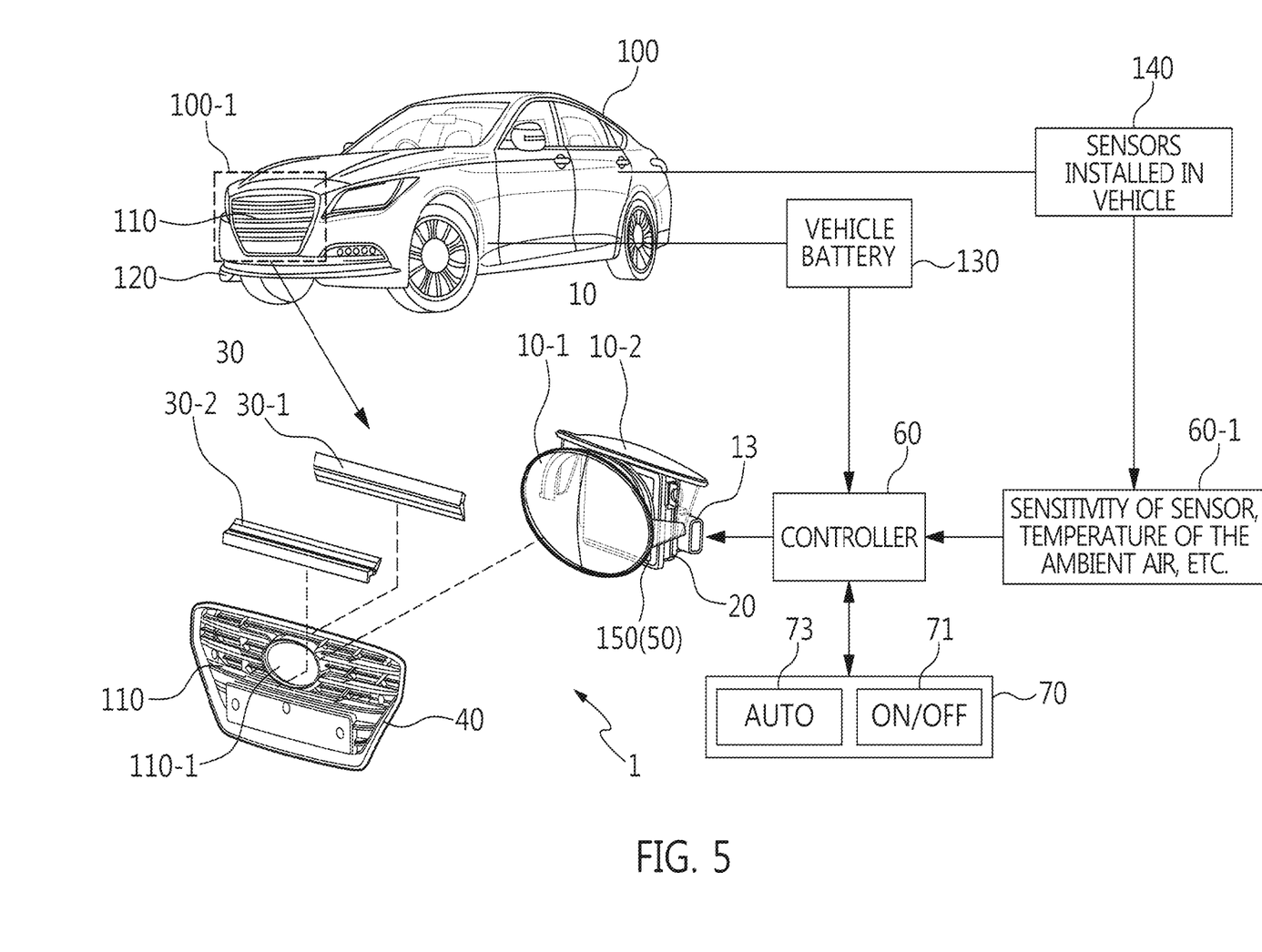
FIG. 5 is a schematic diagram of an example of an autonomous vehicle to which a cover circulation type sensor protection unit according to an embodiment of the present disclosure is applied.
Figure 6:
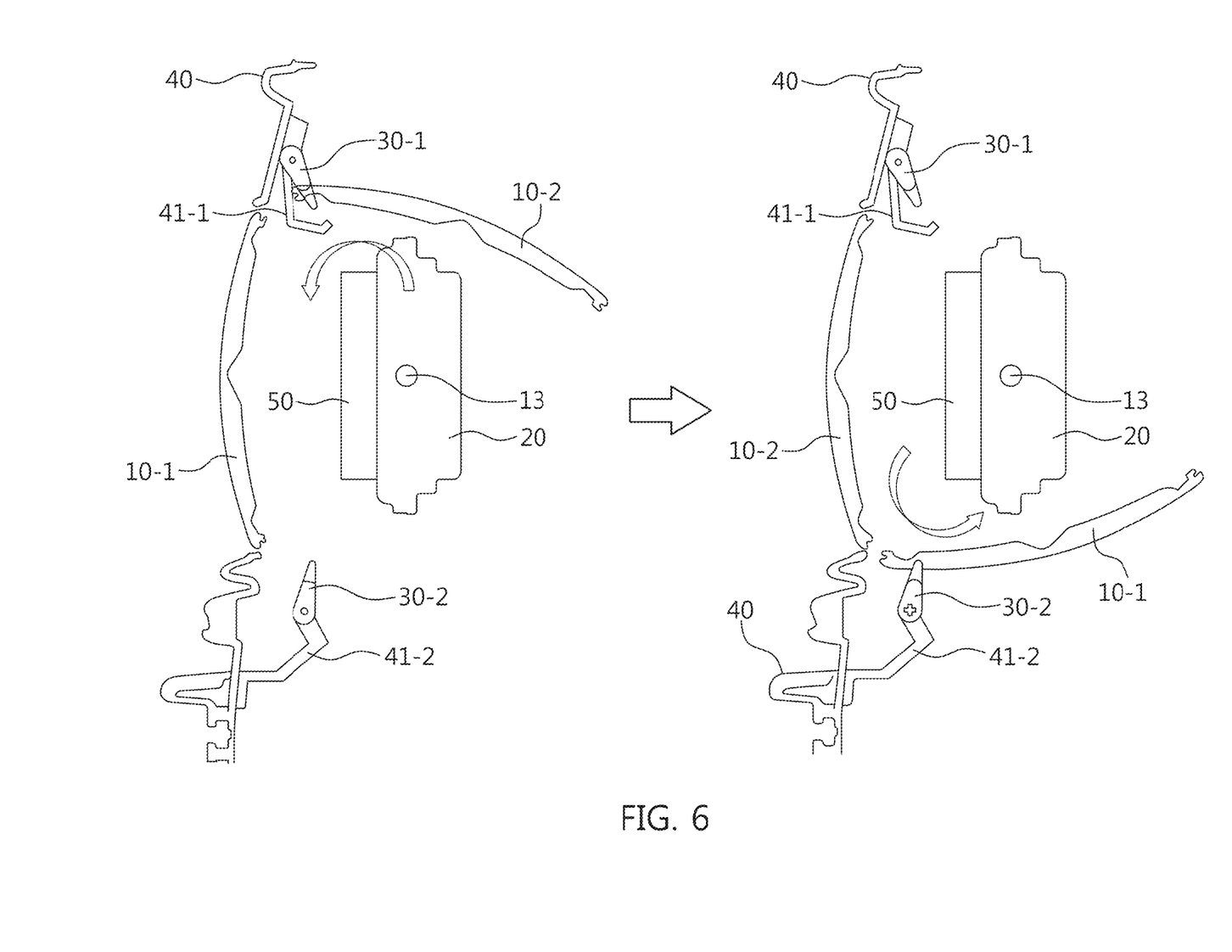
FIG. 6 is a view illustrating downward movement of a cover of the cover circulation type sensor protection unit in an autonomous vehicle according to an embodiment of the present disclosure.
Figure 7:
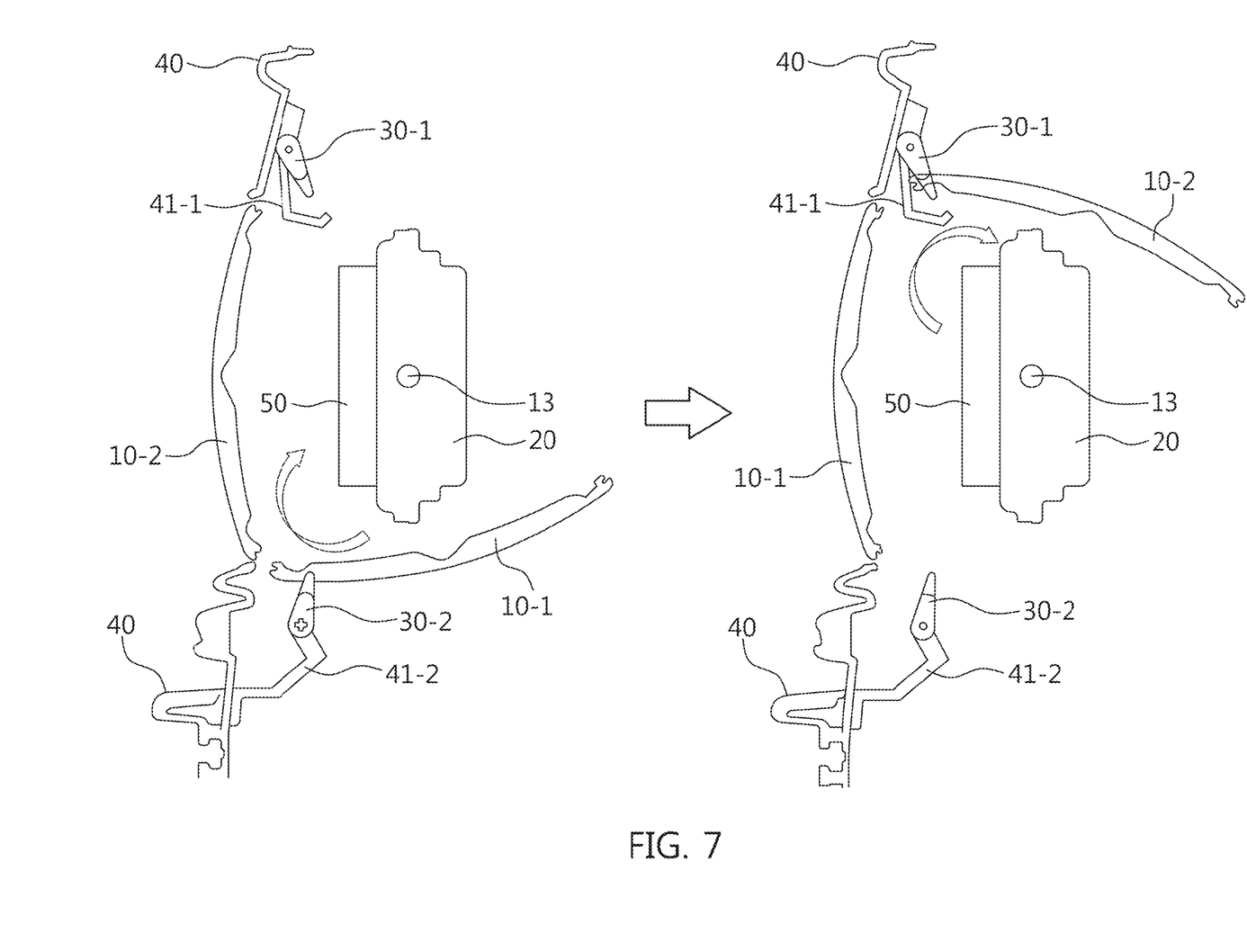
FIG. 7 is a view illustrating upward movement of a cover of the cover circulation type sensor protection unit in an autonomous vehicle according to an embodiment of the present disclosure.

Next, FIGS. 5 to 7 show an example of an autonomous vehicle 100 to which a sensor protection unit 1 is applied.

Referring to FIG. 5, the autonomous vehicle 100 comprises a sensor protection unit 1 installed in a sensor installation area 100-1 at the front part of the vehicle.

Specifically, the sensor protection unit 1 is the same as the sensor protection unit 1 as described above with respect to FIGS. 1 to 4. However, this sensor protection unit 1 is different from the sensor protection unit as described above in that the sensor 50 is replaced with a radar 150, the controller 60 and the actuator 20 are powered by a battery 130 of a vehicle, and the data map 60-1 processes detection information from sensors 140 installed in the vehicle as input. In this case, the sensors 140 installed in the vehicle include a determined value or sensitivity sensor for detecting sensor sensitivity for performance of the radar 150 and a temperature sensor for detecting temperature of the ambient air around the vehicle.

Specifically, the sensor installation area 100-1 comprises a bumper 120 and a radiator grill 110. The radiator grill 110 allows the outside air to flow into a radiator arranged in an engine room. The bumper 120 may be an active bumper including a bumper body for buffering shock and a bumper cover to which a lidar that is a sensor exposed to the outside is mounted while imparting aesthetic external appearance.

Particularly, the radiator grill 110 is formed with a sensor hole 110-1 wherein the sensor hole 110-1 serves as an open space for exposing the sensor cover 10 (i.e., the first cover 10-1 or the second cover 10-2) located at the front part of the radar 150 to the outside when the sensor protection unit 1 is installed.

FIG. 6 illustrates an example where the sensor cover 10 is rotated counterclockwise by operation of the sensor protection unit 1, which shows a case where the first cover 10-1 of the sensor cover 10 that is contaminated by foreign matter and thus deteriorates performance of the radar 150 is replaced with the second cover 10-2 having been maintained in a clean state.

As shown in the figure, the actuator 20 is operated by output of signal for controlling the actuator, which is generated by the controller 60 in response to an ON operation of the manual button 71 or the automatic button 73. In this case, it is assumed that the operation of the actuator 20 is made in such a manner that the rotary shaft 13 is rotated counterclockwise via the rotation conversion member 21.

Therefore, the counterclockwise rotation of the rotary shaft 13 forces the first cover 10-1 to be pushed into toward the lower wiper 30-2 by means of the cover legs 11 fixed to the rotary shaft 13 while forcing the second cover 10-2 to be pushed out toward the upper wiper 30-1.

Therefore, the first cover 10-1 is pushed into toward the lower wiper 30-2 in a state of contacting the lower wiper so that the foreign matter adhered on the surface of the first cover 10-1 is removed by the lower wiper 30-2. Further, the second cover 10-2 is pushed out from the upper wiper 30-1 while its surface is cleaned in a state of contacting the upper wiper and then the first cover 10-1 is placed with the second cover.

As a result, the first cover 10-1 with a clean surface free from foreign matter is located in the lower space of the sensor housing 40 while the second cover 10-2 is located in a clean state at the front part of the radar 150 so that performance of the radar 150 is not deteriorated. The foreign matter removed by the upper wiper 30-1 is collected in the upper drainage culvert 41-1 and then discharged to the outside while the foreign matter removed by the lower wiper 30-2 is collected in the lower drainage culvert 41-2 and then discharged to the outside.

Finally, the controller 60 stops the operation of the actuator 20 in response to an OFF operation of the manual button 71 or the automatic button 73. However, the controller 60 may stop the operation of the actuator 20 at a preset time set in a timer that is set when the automatic button 73 is operated.

On the other hand, FIG. 7 illustrates an example where the sensor cover 10 is rotated clockwise by operation of the sensor protection unit 1, which shows a case where the second cover 10-2 of the sensor cover 10 that is contaminated by foreign matter and thus deteriorates performance of the radar 150 is replaced with the first cover 10-1 having been maintained in a clean state.

As shown in the figure, operation of the actuator 20 by the controller 60 when the manual button 71 or the automatic button 73 is turned on forces the rotary shaft 13 to rotate clockwise so that the second cover 10-2 is pushed into toward the upper wiper 30-1 while the first cover 10-1 is pushed out toward the lower wiper 30-2.

Therefore, the foreign matter adhered on the surface of the second cover 10-2 is removed by the upper wiper 30-1 and simultaneously the first cover 10-1 is pushed out from the lower wiper 30-2 while its surface is cleaned in a state of contacting the lower wiper and then the second cover 10-2 is placed with the first cover.

As a result, the first cover 10-1 is disposed in front of the radar 150 instead of the second cover 10-1 located in the upper space of the sensor housing 40 so that the radar 150 operates without degradation of its performance. In this case, the removed foreign matter collected in the upper drainage culvert 41-1 and the lower drainage culvert 41-2 is discharged to the outside.

Finally, the controller 60 stops the operation of the actuator 20 in response to an OFF operation of the manual button 71 or the automatic button 73. However, the controller 60 may stop the operation of the actuator 20 at a preset time set in a timer that is set when the automatic button 73 is operated.

As described above, the cover circulation type sensor protection unit 1 applied to an autonomous vehicle according to the embodiment of the present disclosure comprises a sensor shutter 1-1 wherein the sensor shutter 1-1 comprises the sensor cover 10 configured to rotate by the actuator 20 such that a front part contaminated by foreign matter is exchanged with a clean front part and the wipers 30 coupled to the sensor housing 40 having an open space in which the sensor 50 is located to remove the foreign matter adhered to the sensor cover 10 so that performance of a sensor for ensuring safety of autonomous driving under environmental conditions of snowfall or rainfall is maintained and particularly both restriction to material of the cover and restriction to temperature of heating wires are eliminated by virtue of not using any heating wire in removing foreign matter to ensure permeability of the cover.

Although the present disclosure has been described in the foregoing with reference to the drawings illustrated by way of example, the present disclosure is not limited to the disclosed embodiments, and it will be apparent to those of ordinary skill in the art that various modifications and variations can be made to the present disclosure without departing from the spirit and scope of the disclosure. Therefore, such modifications or variations fall within the scope of the present disclosure as claimed and the scope of the present disclosure should be interpreted based on the appended claims.

What is claimed is:

1. A sensor protection apparatus comprising:
   a first sensor cover movable between a sensor covering position and a first cover waiting position;
   a second sensor cover movable between the sensor covering position and a second cover waiting position, wherein each of the first and second sensor covers is located at the sensor covering position for protecting a surface of the sensor from being contaminated by foreign matter; and
   an actuator configured to move the first and second sensor covers such that the first sensor cover and the second sensor cover are alternately located at the sensor covering positions thereof,
   wherein the first cover waiting position of the first sensor cover is different from the second cover waiting position of the second sensor,
   wherein the first cover enters under the sensor by an exchange of the sensor covering position while the second cover enters above the sensor by the exchange of the sensor covering position, wherein each of the first and second sensor covers is provided with cover legs having a distance spaced apart from the sensor and wherein the cover legs are coupled to a rotary shaft, and wherein a width between the cover legs of the first cover is narrower than a width between the cover legs of the second cover so that the first cover and the second cover are assembled in a superposed state.

2. The apparatus according to claim 1, wherein the actuator is configured to pivot the first and second sensor covers.

3. The apparatus according to claim 1, wherein actuator is configured to pivot the first and second sensor covers simultaneously, and further configured to move the first sensor cover from the sensor covering position to the first cover waiting position while moving the second sensor cover from the second cover waiting position to the sensor covering position.

4. The apparatus according to claim 1, wherein each of the first and second sensor covers is coupled to the actuator via the rotary shaft.

5. The apparatus according to claim 1, wherein the actuator configured to move the first and second sensor covers such that both the first sensor cover and the second sensor cover are not located at the sensor covering position at the same time.

6. The apparatus according to claim 1, further comprising a sensor housing and wipers coupled to the housing for removing foreign matter from the first and second sensor covers while changing the position of the first and second sensor covers.

7. The apparatus according to claim 6, wherein a drainage culvert is provided at a location between the wipers and the sensor housing, and wherein the drainage culvert forms a space for collecting the foreign matter.

8. The apparatus according to claim 7, wherein the drainage culvert is arranged in an inner space of the sensor housing.

9. The apparatus according to claim 7, wherein the drainage culvert is formed in a curved shape structure having a vertex at a central portion.

10. The apparatus according to claim 1, further comprising:

a first wiper located at a first wiper position between the sensor covering position and the first cover waiting position of the first sensor cover and configured to clean the first sensor cover when the first sensor cover moves between the sensor covering position and the first cover waiting position thereof; and a second wiper located at a second wiper position between the sensor covering position and the second cover waiting position of the second sensor cover and configured to clean the second sensor cover when the second sensor cover moves between the sensor covering position and the second cover waiting position thereof.

11. The apparatus according to claim 1, wherein the sensor comprises an electromagnetic wave transmission and reception sensor.

12. An autonomous vehicle comprising:

a radiator grille comprising a sensor hole;

a sensor coupled to the radiator grille and comprising a surface exposed to the outside through the sensor hole of the radiator grille; and the apparatus of claim 1 coupled to the radiator grille such that at least one of the first and second sensor cover is located at a sensor covering position in front of the surface of the sensor.

13. The autonomous vehicle according to claim 12, wherein the sensor comprises a radar.

14. The autonomous vehicle according to claim 12, further comprising a controller configured to cause the actuator to implement a change of the position of the first and second sensor covers.

15. The autonomous vehicle according to claim 14, wherein the controller is provided with a data map associated with control signal to be output to the actuator and wherein the data map comprises a table about sensitivity of the sensor and temperature of the ambient air.

16. The autonomous vehicle according to claim 14, further comprising a manual button and an automatic button configured to send signals to the controller.

* * * * *